United States Patent
Praun et al.

(10) Patent No.: US 8,854,360 B2
(45) Date of Patent: Oct. 7, 2014

(54) WATER SURFACE GENERATION

(71) Applicant: Google Inc., Mountain View, CA (US)

(72) Inventors: Emil Constantin Praun, Union City, CA (US); John Rohlf, Mountian View, CA (US); Marcin Romaszewicz, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/042,305

(22) Filed: Sep. 30, 2013

(65) Prior Publication Data

US 2014/0028676 A1 Jan. 30, 2014

Related U.S. Application Data

(63) Continuation of application No. 12/588,812, filed on Oct. 28, 2009, now Pat. No. 8,638,330.

(51) Int. Cl.
| | |
|---|---|
| *G06T 15/00* | (2011.01) |
| *G06T 1/00* | (2006.01) |
| *G06T 17/05* | (2011.01) |
| *G06T 17/20* | (2006.01) |

(52) U.S. Cl.
CPC . *G06T 17/05* (2013.01); *G06T 1/00* (2013.01); *G06T 17/205* (2013.01); *G06T 2210/21* (2013.01)
USPC .......................................... 345/419; 345/420

(58) Field of Classification Search
USPC .......................................... 345/419–428, 440
See application file for complete search history.

(56) References Cited

U.S. PATENT DOCUMENTS 8,368,686 B2 2/2013 Sommers
2010/0094597 A1 4/2010 Blain et al.

OTHER PUBLICATIONS

Bilgili, A., Smith, K. W., & Lynch, D. R. (2006). BatTri: A two-dimensional bathymetry-based unstructured triangular grid generator for finite element circulation modeling. Computers & geosciences, 32(5), 632-642.*
Finch, M. (2004). Effective water simulation from physical models. GPU Gems, 1.*
Lindstrom, P., Koller, D., Ribarsky, W., Hodges, L. F., Faust, N., & Turner, G. A. (1996, Aug.). Real-time, continuous level of detail rendering of height fields. In Proceedings of the 23rd annual conference on Computer graphics and interactive techniques (pp. 109-118). ACM.*
Bilgili et al., "BatTri: A Two-Dimensional Bathymetry-Based Unstructured Triangular Grid Generator for Finite Element Circulation Modeling," Computers & Geosciences, 32.5:632-642 (2006).
Finch, "Effective Water Simulation from Physical Models," GPU Gems, Chapter 01 (2004).
Lindstrom et al., "Real-time, Continuous Level of Detail Rendering of Height Fields," Proceedings of the 23rd Annual Conference on Computer Graphics and Interactive Techniques, ACM (1996).

* cited by examiner

*Primary Examiner* — Hau Nguyen
*Assistant Examiner* — Ryan M Gray
(74) *Attorney, Agent, or Firm* — Marshall, Gerstein & Borun LLP

(57) ABSTRACT

Terrain data that represents earth features for a geographic area is received. The following meshes are generated based on the terrain data: (i) a water surface mesh including a first plurality of geometric primitives and (ii) a water bottom mesh including a second plurality of geometric primitives. Portions of the water bottom mesh appearing above the water surface mesh are identified. At least one of the water surface mesh and the water bottom mesh are corrected to cause the water surface mesh to appear above the water bottom mesh.

20 Claims, 12 Drawing Sheets

WATER SURFACE GENERATION

REFERENCE TO RELATED APPLICATION

This application is a continuation of and claims priority to U.S. patent application Ser. No. 12/588,812 filed on Oct. 28, 2009, and titled "Water Surface Generation," the entire disclosure of which is hereby expressly incorporated by reference herein.

FIELD OF THE INVENTION

Embodiments of the present invention relate to geographical information systems and applications.

BACKGROUND ART

Geographical information is increasingly being made available to users in a variety of systems and applications. Geographical information can include terrain data representative of surface features including land and water surfaces. In many applications, terrain data can cover a large surface area such as a surface of the Earth. Different resolutions of the terrain data are used to facilitate rendering and viewing of the terrain data from different viewing distances relative to the terrain. Multi-resolutional terrain information can also be provided in tiles. Such tiles are especially helpful in many online geographical information systems or services, such as Google Earth, so that the most relevant geographical information to a location being viewed can be served to a remote client device for display.

In many instances, the amount of geographical information is large and may correspond to a curved surface, such as, all or part of the surface of the Earth or other body. Approximations are then needed especially when the geographical information needs to be sent over a network to remote users. For example, online geo-spatial applications render the intrinsically-curved surface of the Earth though a series of approximations, typically including the creation of a multi-resolution tiled triangle mesh, compression for network transmission, format and scale conversions for display using a graphics card, and distance from camera encoding in a frame buffer for depth comparison.

One approximation that has been used is a simple mesh simplification that simplifies a terrain mesh by removing less important primitives. This reduces the amount of detail available for rendering, but has the advantage of reducing the amount of mesh information that needs to be transmitted over a network to a client device.

As recognized by the inventors, however, such approximations and especially simple mesh simplification, have significant failings especially when rendering a water surface on a curved body or near land boundaries or shallow areas, such as, a shoreline.

BRIEF SUMMARY

Embodiments described herein refer to systems and methods for approximating terrain data representing a water surface. In one embodiment, a computer-based geographical information system for approximating terrain data representing a water surface for transmission over a network to a client device for display is provided. The system includes a memory that stores terrain data, a mesh generator, a mesh simplifier, and a surface inversion corrector. The mesh generator converts the terrain data into an initial water surface mesh and an initial water bottom mesh. The mesh simplifier simplifies the initial water surface mesh and the initial water bottom mesh to obtain a simplified water surface mesh and a simplified water bottom mesh. The surface inversion corrector corrects the simplified water surface mesh and/or simplified water bottom mesh to avoid having a water bottom surface incorrectly appear above a corresponding water surface relative to a viewpoint during rendering for display.

In one example, the mesh simplifier simplifies the initial water surface mesh while accounting for water/land boundaries. The mesh simplifier also simplifies the initial water bottom mesh while accounting for geographic features and/or water/land boundaries.

According to a further feature, the surface inversion corrector identifies one or more inversions between the simplified water bottom and water surface meshes, and alters mesh information in at least one of the simplified water bottom and water surface meshes to remove the identified inversions.

In another embodiment, a computer-implemented method for approximating terrain data representing a water surface for transmission over a network to a client device for display is provided. The method includes steps of storing terrain data in memory, converting the terrain data into an initial water surface mesh and an initial water bottom mesh, and simplifying the initial water surface mesh and/or initial water bottom mesh. The method further includes correcting the simplified water surface mesh and/or simplified water bottom mesh to avoid having a water bottom surface incorrectly appear above a corresponding water surface relative to a viewpoint during rendering for display.

In a further embodiment, a system for altering tile information received at a client device for display is provided. The client device includes a mesh manipulator. The mesh manipulator manipulates mesh information in a tile to displace boundary vertices towards an exterior of the tile based on the respective tile resolution level and to adjust one or more selected vertices to avoid surface inversions between water bottom and water surface meshes associated with the tile.

In another embodiment, a method for altering tile information received at a client device for display is provided which includes manipulating mesh information in a tile, and displaying a rendered display view of the tile based on the manipulated mesh information. The manipulating includes displacing boundary vertices towards an exterior of the tile based on the respective tile resolution level and adjusting one or more selected vertices to avoid surface inversions between water bottom and water surface meshes associated with the tile.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF EMBODIMENTS OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Overview

The inventors recognized that conventional approximations and especially simple mesh simplification have significant failings when applied to a mesh covering an intrinisically curved surface such as the Earth or other body. These failings are even more pronounced when two meshes near one another, such as, a water surface mesh and a water bottom mesh, need to be simplified. For instance, the inventors found that because of these approximations and the curvature of the Earth, undesirable surface inversions can occur where a water bottom surface appears above a water surface when two conventional simplified meshes representing the water surface and water bottom surface are rendered. Using conventional simplified meshes can also degrade the shading detail in a rendered display view of regions near a shoreline where water depth is relatively shallow. In some situations, gaps can occur when a client device is rendering multi-resolutional tile information.

Embodiments of the present invention described herein include systems and methods for approximating terrain data representing a water surface. These embodiments overcome the above disadvantages while still allowing approximation of terrain data for transmission over a network. Improvements are provided which can allow approximation for terrain data representing a water surface while avoiding the appearance of false islands and/or maintaining more detail and visual appearance near water/land boundaries.

System

Figure 1:
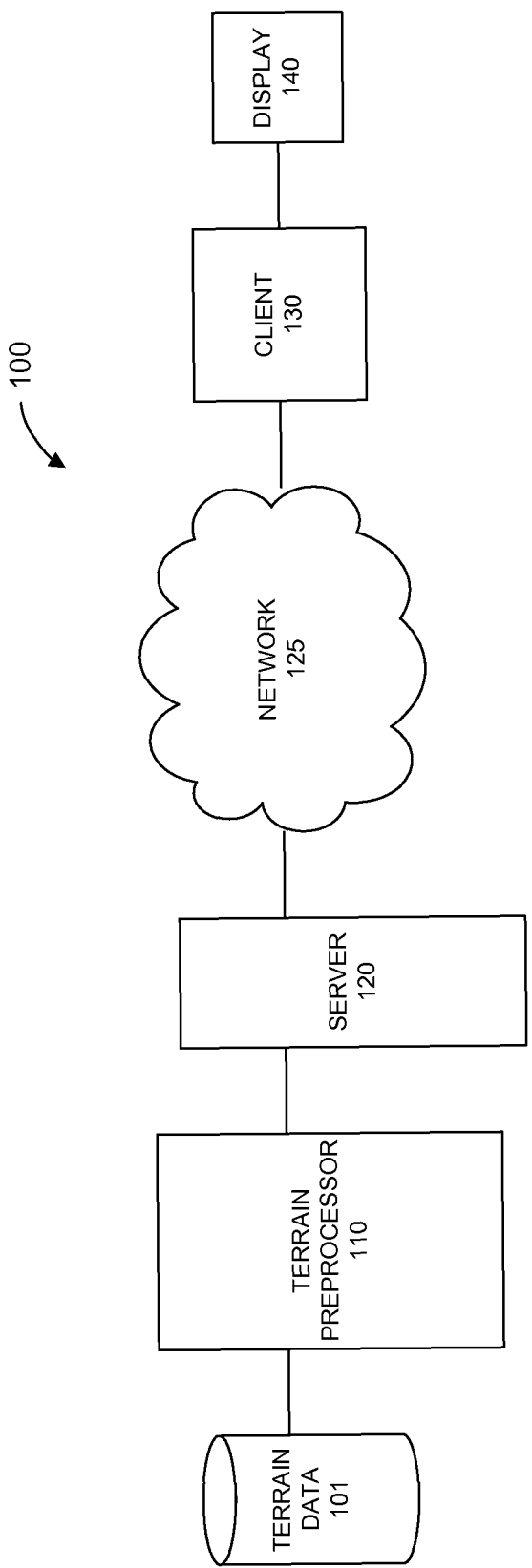
FIG. 1 is a diagram of an online geographical system, according to an embodiment of the present invention.

FIG. 1 is a diagram of an online geographical system 100 according to an embodiment of the present invention. Computer-based geographical information system 100 approximates terrain data representing a water surface for transmission over a network 125 to a client device 130 for display on display 140. System 100 includes a memory 101 coupled to a terrain preprocessor 110. Terrain preprocessor 110 is coupled to server 120 which in turn is coupled to one or more networks 125.

Memory 101 stores terrain data. Memory 101 can be any type of memory device including, but not limited to, a database stored on one or more local or remote storage devices. Terrain data can be any type of terrain data representing water bottom and water surface information. In one example, the terrain data includes one or more height grids having height values that correspond to the height (also called elevation) of a body surface at various locations. The body surface can be a surface on any body including an intrinsically curved body such as, the Earth or other body.

Terrain preprocessor 110 accesses terrain data in memory 101 and outputs an approximation of the terrain data to server 120 for transmission over one or more networks 125. In one example, server 120 may process and fulfill requests for terrain data from remote client device 130. Multi-resolutional terrain data served by server 120 in tiles to client device 130 may also be used. Such multi-resolutional tiles are often used in online applications and services so that chunks of the most relevant terrain data may be served to a client device 130 in real-time or with relatively little delay compared to providing an entire terrain data set.

Server 120 can be implemented in software, hardware, firmware or any combination thereof on one or more computing devices. Such computing devices can include at least one processor and memory. In examples, server 120 can also include or support World Wide Web services and protocols, or can be coupled to a separate web server. Network 125 can be any one or more computer networks including, but not limited to, wired or wireless networks, local area networks, medium-area networks, or wide-area networks like the Internet.

Terrain Preprocessor for Water Surfaces

According to a feature, terrain preprocessor 110 approximates terrain data representing a water surface. Terrain preprocessor 110 is further described below with respect to FIG. 2.

Figure 2:
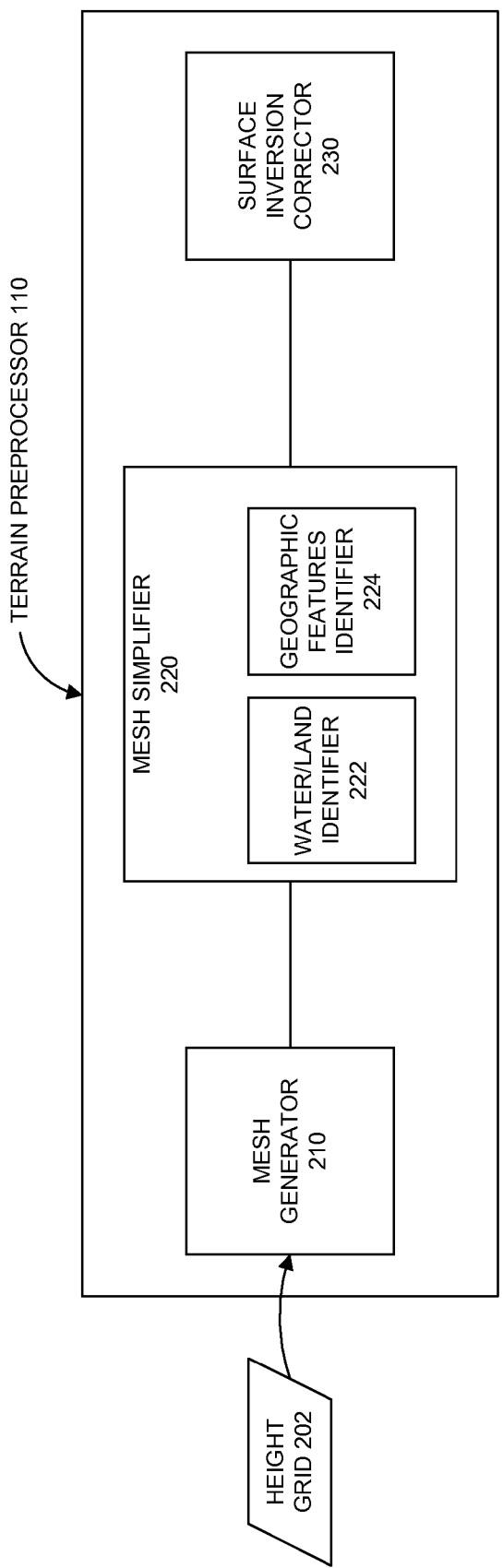
FIG. 2 is an example showing a terrain preprocessor of FIG. 1 in further detail according to an embodiment of the present invention.

FIG. 2 is an example showing terrain preprocessor 110 of FIG. 1 in further detail according to an embodiment of the present invention. Terrain preprocessor 110 includes a mesh generator 210, a mesh simplifier 220, and a surface inversion corrector 230. Mesh generator 210 converts terrain data from memory 101 into an initial water surface mesh and an initial water bottom mesh. For example, mesh generator 202 may rasterize samples of terrain data using a height grid 202 to obtain fully tessellated meshes for a water surface and a water bottom underneath the water surface.

Mesh simplifier 220 simplifies the initial water surface mesh and/or the initial water bottom mesh output from mesh generator 210 to obtain a simplified water surface mesh and a simplified water bottom mesh. This simplification may involve removing primitives in areas of the mesh that are less important.

In one embodiment as shown in FIG. 2, mesh simplifier 220 includes water/land identifier 222 and geographic features identifier 224. Water/land identifier 222 analyzes vertices in the primitives of a mesh and identifies areas of water/land boundaries in the mesh. For example, water/land identifier 222 may analyze altitude data in the vertices of the primitives of an initial water surface and water bottom meshes to identify areas of water/land boundaries where the water bottom altitude at least equals that of the water surface.

Geographic features identifier 224 analyzes vertices in the primitives of a mesh and identifies areas having geographic features. For example, these geographic features may be significant geographic features, such as, mountains, canyons, etc. Geographic features identifier 224 may determine such features by analyzing the topology of the water bottom mesh. For example, by analyzing altitude data in the vertices of the primitives of the water bottom meshes, slopes of mountains and canyons can be found as well as their area. Shelf areas near a coastline or near an island can also be determined.

In one embodiment, mesh simplifier 220 simplifies an initial water surface mesh while accounting for water/land boundaries identified by water/land identifier 222. In this way, primitives associated with water/land boundaries are retained or favored during simplification. Because water surfaces are typically flat significant mesh simplification can be realized in areas of open water away from coastlines as relatively few primitives may be needed to cover a large area in sufficient detail. Also, because water surfaces are often flat geographic features need not be accounted for in many cases, but the invention is not so limited, and geographic features or other special regions could be accounted for during water surface mesh simplification if desired.

Mesh simplifier 220 also simplifies an initial water bottom mesh while accounting for water/land boundaries and geographic features identified by water/land identifier 222 and geographic features identifier 224 respectively. In this way, primitives associated with water/land boundaries and geographic features are retained or favored for retention during simplification. In other examples, mesh simplifier 220 could simplify an initial water bottom mesh while accounting for water/land boundaries only, geographic features only, or even omit mesh simplification for the water bottom mesh if rich detail were desired throughout the mesh.

Surface inversion corrector 230 corrects the simplified water surface mesh and/or simplified water bottom mesh output from mesh simplifier 220 to avoid having a water bottom surface incorrectly appear above a corresponding water surface relative to a viewpoint during rendering for display. This can especially occur in areas where mesh simplification as resulted in larger area primitives, such as, over open water on a large lake, sea, or ocean, and the terrain covers an intrinsically-curved surface such as the Earth. In one embodiment, surface inversion corrector 230 identifies one or more inversions between the simplified water bottom and water surface meshes, and alters mesh information in at least one of the simplified water bottom and water surface meshes to remove the identified inversions.

Terrain preprocessor 110 including its components (mesh generator 210, a mesh simplifier 220, and a surface inversion corrector 230) can be implemented in software, hardware, firmware or any combination thereof on one or more computing devices. A computing device can be any type of device having one or more processors and memory. For example, a computing device can be a workstation, mobile device (e.g., a mobile phone, personal digital assistant, tablet or laptop), computer, server, compute cluster, server farm, game console, set-top box, kiosk, embedded system or other device having at least one processor and memory. Embodiments of the present invention may be software executed by a processor, firmware, hardware or any combination thereof in a computing device.

The operation of terrain preprocessor 110 and its components is described in further detail below.

Client Device

Figure 3:
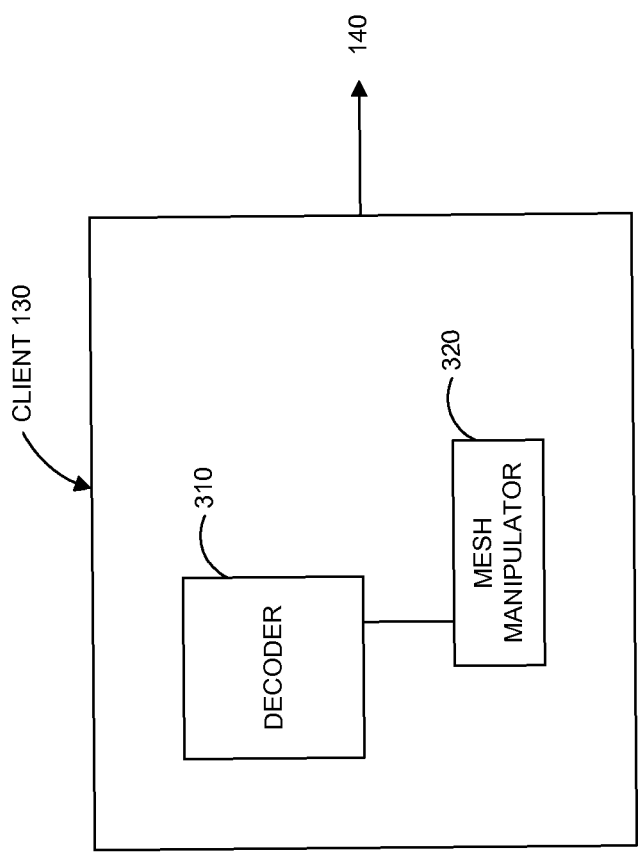
FIG. 3 is an example showing a client device of FIG. 1 with a mesh manipulator according to an embodiment of the present invention.

FIG. 3 is an example showing client device 130 of FIG. 1 in further detail according to an embodiment of the present invention. Client device 130 includes decoder 310 and mesh manipulator 320. Client device 130 can be any computing device coupled to network 125. Client device 130 is coupled to a display 140. Display 140 can be any type of display. Client device 130 can also include a renderer that renders a display view of a tile, including mesh information manipulated by mesh manipulator 320, for display on display 140.

In one embodiment, client device 130 include a user-interface that allows a remote user viewing display 140 to interact and request geographical information. In one example, client device 130 can also include a web browser and a geographical information application that communicates with server 120 and sends and processes requests for geographical information for display to the remote user. For instance, in one embodiment, a web browser, such as, Google Chrome, Apple Safari, Microsoft Internet Explorer, or other type of browser may be used. A geographical information application, such as, Google Earth, Google Maps, Microsoft Virtual Earth, NASA Worldwind, may be used. Online games and other type of applications using terrain data for curved bodies like planets may also be used as a geographical information application.

Decoder 310 decodes geographical information received at client device 130 (such as, multi-resolutional tiles) to obtain underlying mesh information. In an embodiment, this mesh information may include portions of simplified water surface and/or water bottom meshes output from terrain preprocessor 110.

Mesh manipulator 320 is coupled to decoder 310. In an embodiment, mesh manipulator 320 manipulates mesh information in a tile to displace boundary vertices towards an exterior of the tile based on the respective tile resolution level. This helps avoid gaps from appearing between neighboring tiles when displaying multi-resolutional tiles but can lead to unwanted surface inversions on a water surface. According to a feature, mesh manipulator 320 further manipulates the mesh information to adjust one or more selected vertices to avoid surface inversions between water bottom and water surface meshes associated with a tile when rendered for display. The operation is described further below.

Operation

Figure 4:
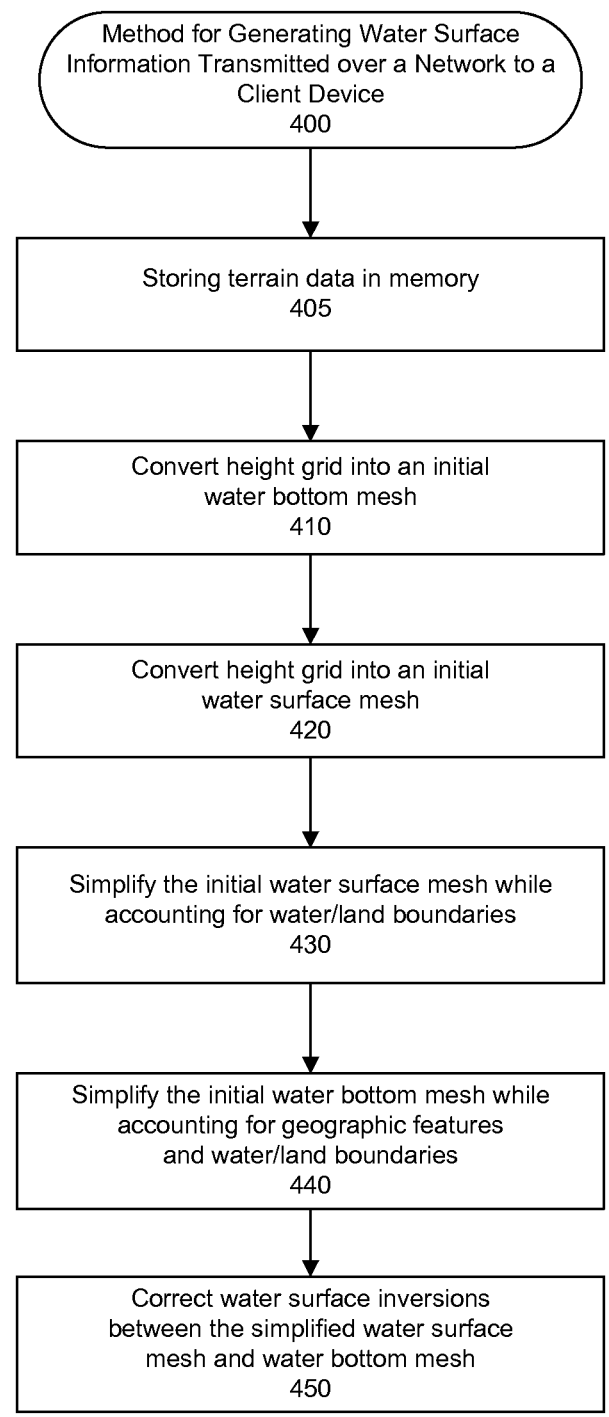
FIG. 4 is a flowchart illustrating a method for generating water surface information for transmission over a network to a client device according to an embodiment of the present invention.

FIG. 4 is a flowchart illustrating a method for generating water surface information 400 for transmission over a network to a client device according to an embodiment of the present invention. Method 400 includes steps 405-450. For brevity, method 400 will be described with respect to geographic information system 100, especially terrain preprocessor 110, but is not necessarily limited to this system or structure. Method 400 could be implemented or carried out in other systems as would be apparent to a person skilled in the art given this disclosure. Method 400 will also be described with respect to examples for illustrative purposes that are not necessarily intended to limit the present invention.

In an embodiment, method 400 is a computer-implemented method for approximating terrain data representing a water surface for transmission over a network to a client device for display (steps 405-450). In step 405, terrain data, such as a height grid 202, is stored in memory 101. Terrain data including the height grid is then converted into an initial water bottom mesh (step 410) and an initial water surface mesh (step 420). For example, step 410 may be carried out by mesh generator 210 as described earlier.

Figure 8A:
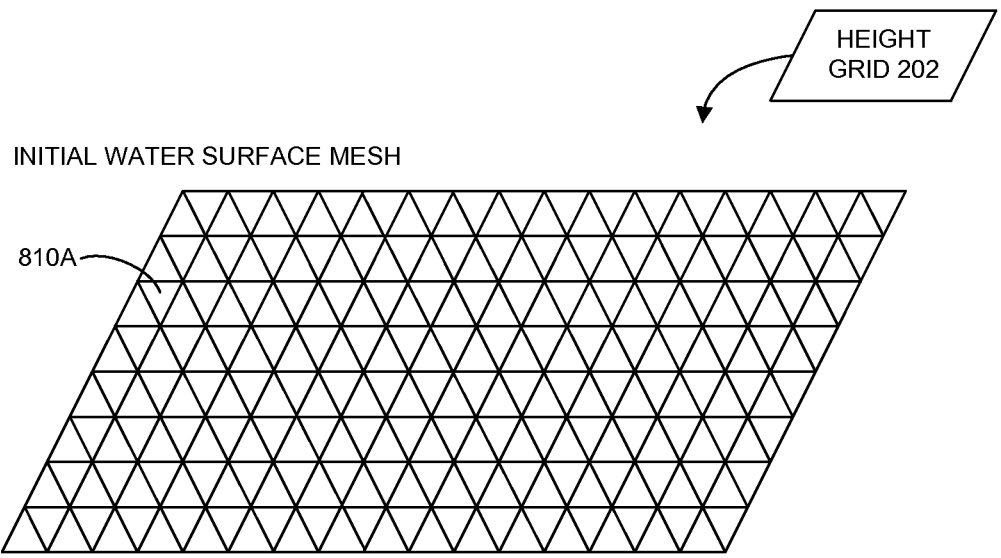
FIG. 8A shows initial water surface and water bottom meshes according to an example.
Figure 8A:
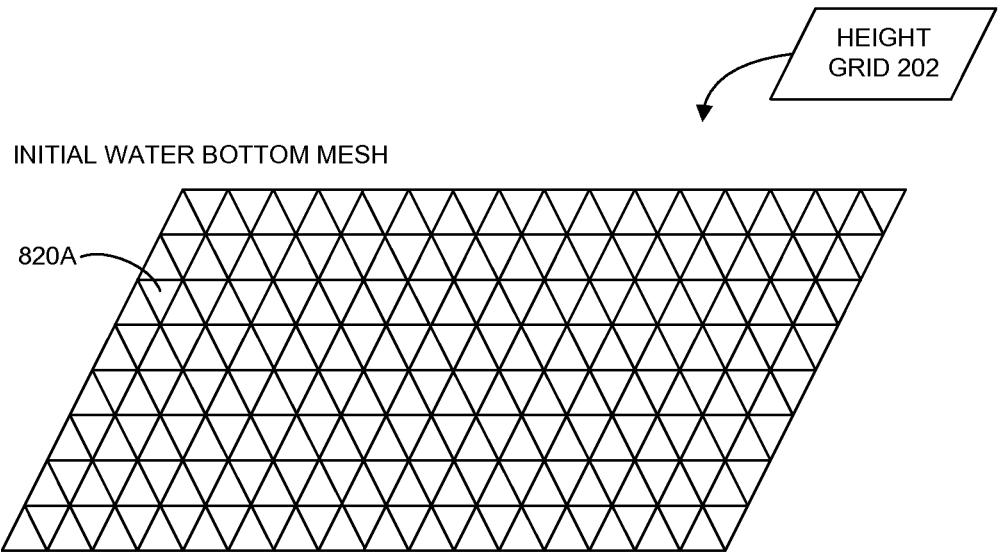

FIG. 8A is a representation of a portion of an initial water surface mesh 810A and water bottom mesh 820A converted from samples of a terrain data and height grid 202 according to an example. Terrain data is sampled and rasterized into a fully tessellated mesh made up of primitives (in this case triangles). Vertices of the primitives have data representing terrain properties including altitude. The altitude (or elevation) can be determined from the height grid values alone or other topological information if known. In this example, both water surface mesh 810A and water bottom mesh 820A are initially fully tesselated with a uniform and relatively fine distribution of primitives as shown in FIG. 8A. This example is not limited to triangles, and other types and shapes of primitives may be used.

Mesh Simplification

Next mesh simplification is carried out. In step 430, the initial water surface mesh is simplified while accounting for water/land boundaries. In step 440, the initial water bottom mesh is simplified while accounting for geographic features and/or water/land boundaries. For example, steps 430-440 may be carried out by mesh simplifier 220 as described earlier.

Figure 5:
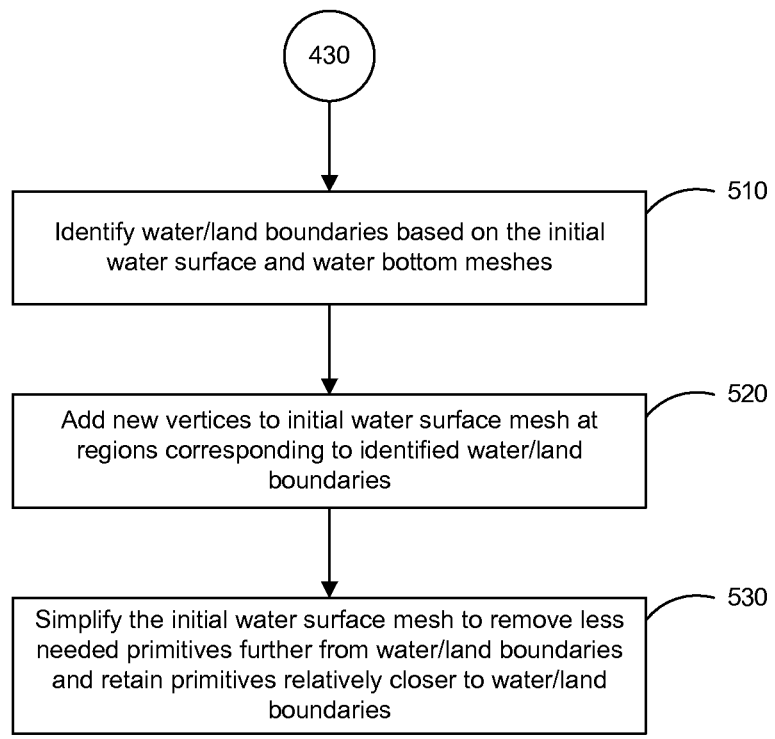
FIG. 5 is a flowchart illustrating in further detail a water surface mesh simplifying step of FIG. 4 according to an embodiment of the present invention.

FIG. 5 is a flowchart illustrating in further detail water surface mesh simplifying step 430 according to an embodiment of the present invention. The water surface simplifying includes steps 510-530. In step 510, one or more water/land boundaries in the initial water surface mesh are identified. New vertices may be added to the initial water surface mesh at regions corresponding to the identified water/land boundaries (step 520). The initial water surface mesh is then simplified with the added vertices by removing primitives further from identified water/land boundaries and retaining primitives relatively close to identified water/land boundaries (step 530). In one example, the water surface mesh simplifying in step 530 treats the added vertices as a special case and retains the added vertices and their corresponding primitives. In another example, the water surface mesh simplifying in step 530 includes determining a curve based on the added vertices and retains vertices (and their corresponding primitives) associated with the curve. In both examples, primitives relatively far from water/land boundaries can be removed (i.e. vertices can be deleted or dropped) and the mesh retessellated to form new larger primitives between the remaining vertices in a simplified water surface mesh.

Further, water bottom simplifying step 440 may include identifying geographic features and/or water/land boundaries, and simplifying the initial water bottom mesh by removing primitives based on the identified geographic features and/or water/land boundaries. For example, primitives located relatively close to identified geographic features and/or water/land boundaries may be retained or favored. Primitives located relatively far from identified geographic features and/or water/land boundaries may be deleted or dropped and the mesh retessellated to form new larger primitives between the remaining vertices in a simplified water bottom mesh.

Figure 8B:
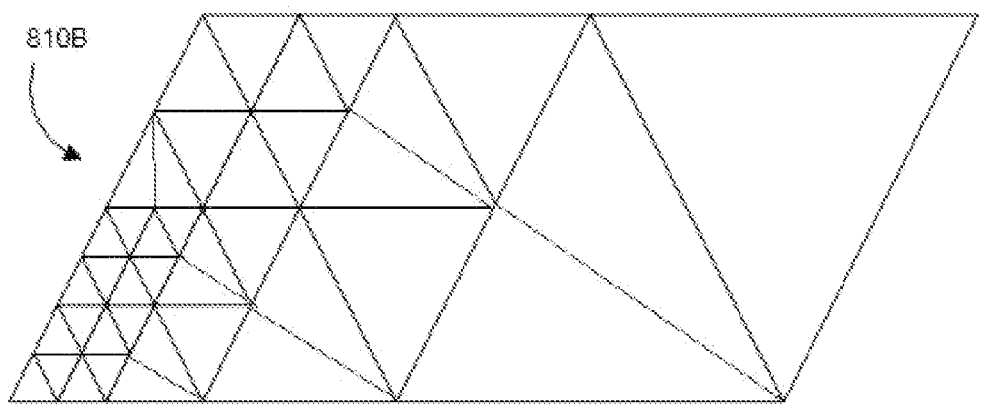
FIG. 8B shows simplified water surface and water bottom meshes for a region of land and water according to an example.
Figure 8B:
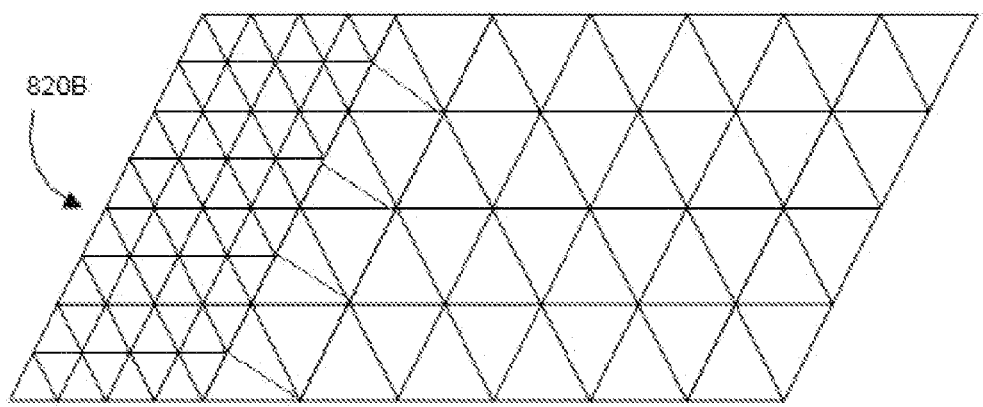
Figure 8B:
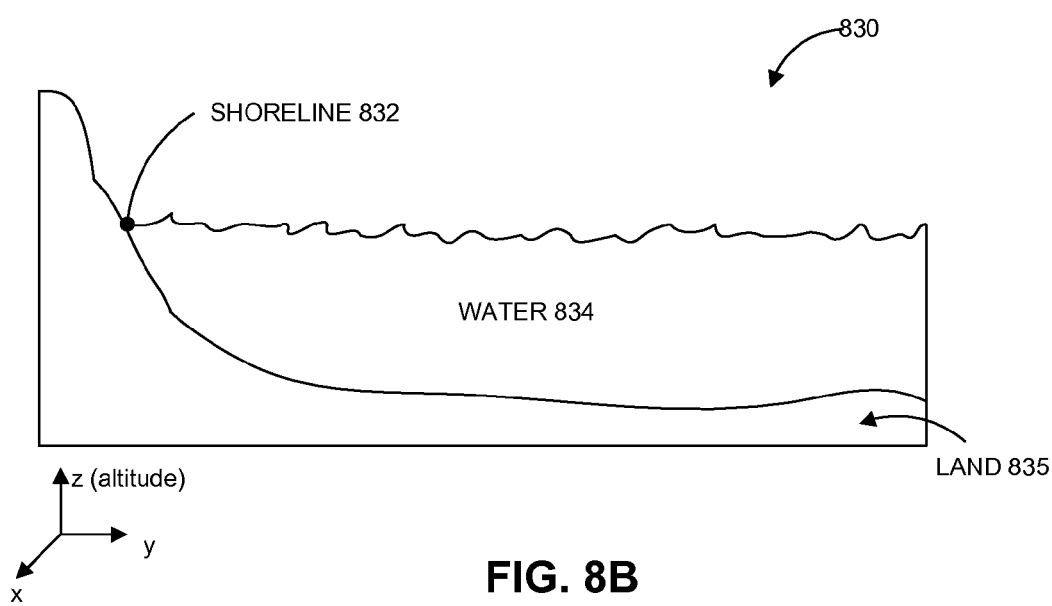

FIG. 8B shows example simplified water surface and water bottom meshes 810B, 820B for a region 830 of land 835 and water 834 obtained from initial meshes 810A, 820A according to steps 430 and 440. Water surface mesh 810B is much more simplified than initial water surface mesh 810A. As shown in FIG. 8B, simplified water surface mesh 810B has less vertices in areas further from an identified shoreline 832. Vertices have been dropped and primitives re-tesselated to cover larger areas in less detail. On the other hand, vertices and corresponding primitives have been retained at or close to the shoreline 832. Similarly, simplified water bottom mesh 820B has less vertices in areas further from an identified shoreline 832 but retains vertices in areas near water/land boundaries (e.g., shoreline 832) and favors vertices in geographic features of interest such as the gradual slopping of the land 835 in a shelf area near the shoreline shown in FIG. 8B. Some vertices have been dropped and primitives re-tesselated to cover larger areas in less detail to simplify the mesh information in water bottom mesh 820B, but not as much simplification as was done for water surface mesh 810B.

Surface Inversion Correction

Finally, in step 450, the method further includes correcting the simplified water surface mesh and/or simplified water bottom mesh to avoid having a water bottom surface incorrectly appear above a corresponding water surface relative to a viewpoint during rendering for display. For example, step 450 may be carried out by surface correction generator 230 as described earlier.

Figure 6:
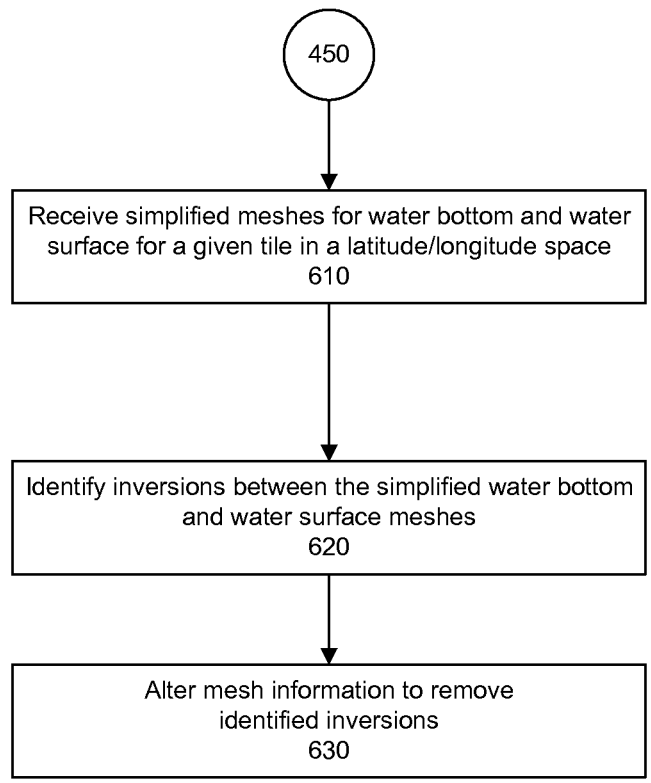
FIG. 6 is a flowchart illustrating in further detail a water surface inversion correcting step of FIG. 4 according to an embodiment of the present invention.

FIG. 6 is a flowchart illustrating in further detail water surface inversion correcting step 450 according to an embodiment of the present invention. Water surface inversion correcting step 450 includes steps 610-630. Simplified meshes for 12 the water bottom and water surface meshes are received (step 610). This receiving can include accessing stored simplified water bottom and water surface meshes as well. In step 620, one or more surface inversions between the simplified water bottom and water surface meshes are identified. Then, a step of altering mesh information in at least one of the simplified water bottom and water surface meshes to remove the identified inversions is performed (step 630). These steps of identifying surface inversions and altering mesh information can be carried out in different ways depending upon the meshes involved, the actual water surface location being represented, and/or the type of surface inversion encountered (that is, whether vertice(s) or edge(s) are sticking up as "false islands"). For instance, mesh information may be altered in the water bottom mesh to push a portion of the mesh down away from the water surface. Mesh information may also be altered in the water surface mesh to push a portion of the mesh up toward a water surface away from the water bottom mesh. These approaches are described and further shown below with respect to FIGS. 9A-9C.

Figure 9A:
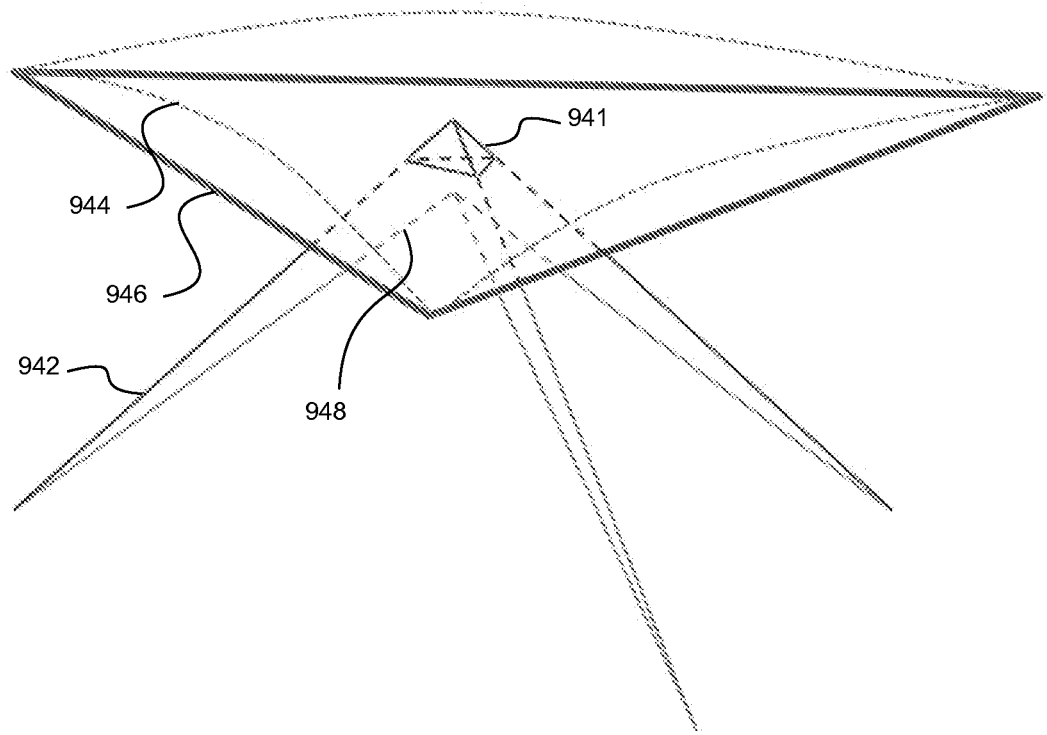
FIGS. 9A-9C shows examples of surface inversion occurrence and correction according to an embodiment of the present invention.

In one embodiment, the identifying surface inversions step 620 comprises: rendering the primitives of the water surface mesh and computing an effective depth of the water surface mesh. The computed effective depth is compared with given depths of the simplified water bottom mesh vertices to determine when an inversion is present where a vertex of the water bottom surface would intersect with or be above the water surface mesh relative to a viewing direction in a rendered display. In this case, the altering step 630 would then modify an altitude of a respective vertex of the water bottom surface at the location of the surface inversion such that the water bottom surface is effectively pushed below the water surface relative to a viewing direction in a rendered display. This surface inversion correction is shown in the example of FIG. 9A. In FIG. 9A, a surface inversion occurs at a false island 941. False island 941 is caused by a terrain vertex in water bottom mesh 942 poking above the discretized simplified water surface mesh 946. The vertex of false island 941 is "below" the actual spherical water surfaces 944, but since what would get drawn is the piecewise linear version of water surface mesh 946, an artifact or surface inversion is obtained. This is solved in step 630 by "pushing down" the terrain vertex to changing the mesh to a lower elevation as shown by the final altered water bottom mesh 948. This changes the elevation data displayed for the water bottom, but the error introduced may be comparable to the error caused by the simplification, and deemed acceptable for the given resolution level of the tile and its associated intended viewing distance.

In another embodiment, a surface inversion that needs to be corrected may appear where a water bottom edge crosses above a water surface edge. In this case, the identifying surface inversions step 620 comprises computing all the top-down view intersections of water surface mesh edges with water bottom mesh edges. For each such intersection, the effective depths of the surfaces of the two meshes are compared to detect possible inversions. The altering mesh information step 630 then comprises adding a water surface vertex to the water surface mesh for each one of the intersections that has an inversion. The depth of these new vertices is implicitly the depth of the water surface. New edges can be added based on the added vertices to restore a fully tessellated water surface mesh.

Figure 9B:
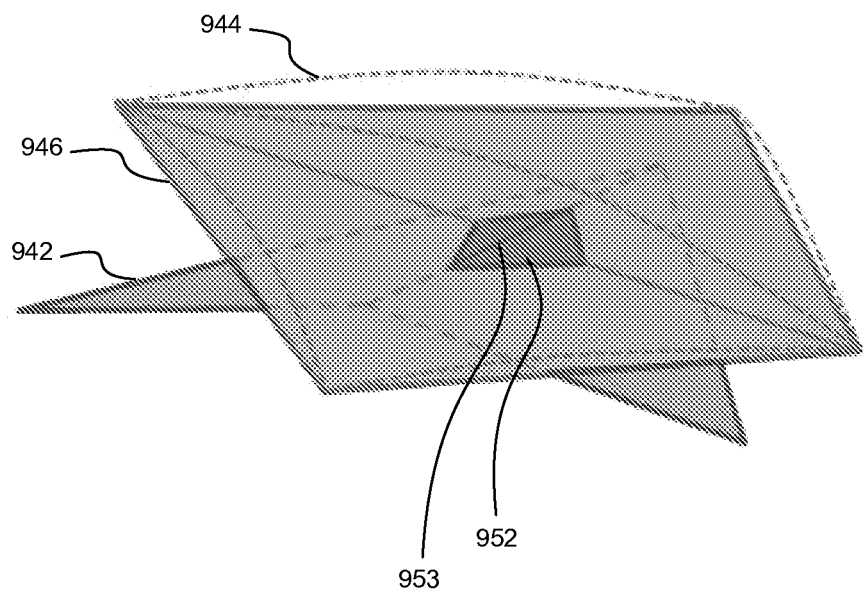
Figure 9C:
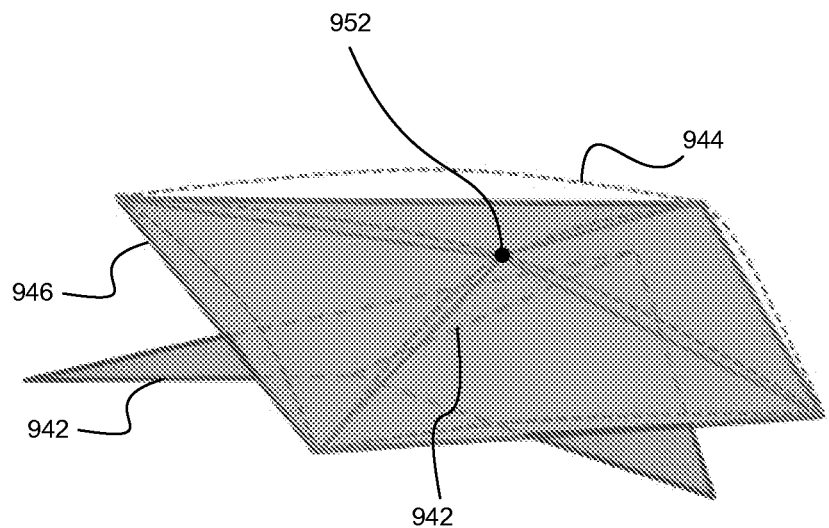

This surface inversion correction of an edge is shown in the example of FIGS. 9B-9C. FIG. 9B shows a false island 952 caused by a piece of a terrain mesh edge 953 getting above a piece of the discretized water surface mesh 946, even though it would be below the curved water surface 944. This is solved in step 630 by introducing a new water surface mesh vertex, at the latitude/longitude location where the projection of the 2 meshes intersect, and at the correct water surface altitude 952 (shown in FIG. 9C).

Client Side Tile Alteration

Figure 7:
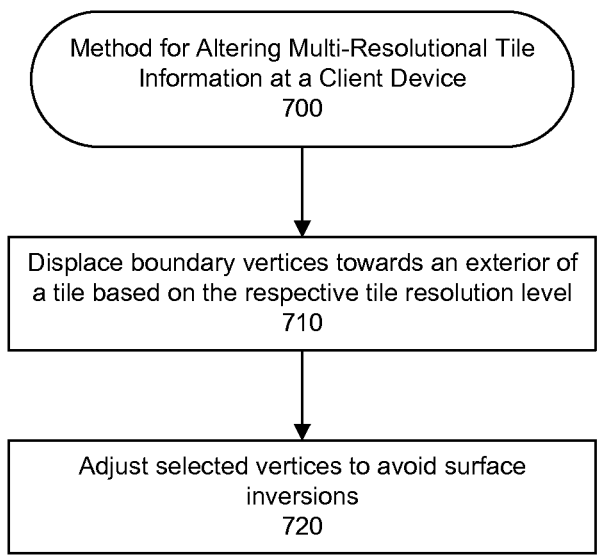
FIG. 7 is a flowchart illustrating a method for altering multi-resolutional tile information at client device according to an embodiment of the present invention.

FIG. 7 is a flowchart illustrating a method for altering multi-resolutional tile information 700 at client device according to an embodiment of the present invention (steps 710-720). Method 700 may be carried out by mesh manipulator 320 in client device 130 when rendering one or more multi-resolution tiles for display. In this way mesh information is further manipulated so that a rendered display view of a water surface will not include undesired surface inversions.

The altering includes displacing boundary vertices of the water surface mesh towards an exterior of the tile based on the respective tile resolution level (step 710) in order to avoid gaps when rendering neighboring multi-resolutional tiles. Since sliding vertices outwards on a curved surface such as a sphere can decrease the effective depth in the interior of triangles, the vertices are also displaced towards the exterior of the sphere to maintain the minimum effective depth of all the triangles affected and thus prevent further inversions with the water bottom mesh associated with the tile (720).

Method 700 is not limited to tile information and can be used with other types of multi-resolutional terrain data.

FURTHER EXAMPLE

Figure 10:
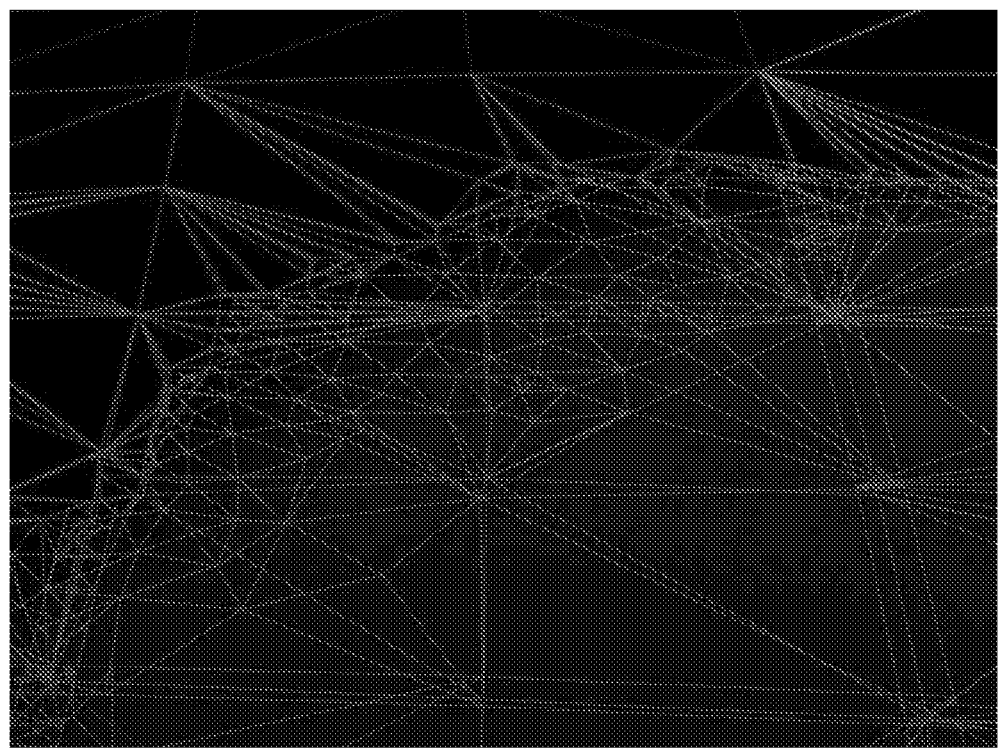
FIG. 10 shows an example in color of simplified water bottom and water surface meshes near a coastline in an embodiment of the present invention.

FIG. 10 shows an example screen shot of a simplified water bottom mesh (pink) and a simplified water surface mesh (teal) near a coastline in an embodiment of the present invention. On the right and bottom edges of the image one can see some long pink lines each parallel to 2 teal lines—that's due to tile bloating in a client device. One of each of the 2 lines corresponds to the tile being looked at here, and one to a neighboring tile. In this example, the ground does not change very much so there are very few pink vertices—most are needed to capture the coast line with high fidelity. The larger number of vertices and triangles for the water surface mesh are needed for the smooth opacity transition near the coast line.

Recap Discussion and Advantages

Further discussion and advantages of embodiments with respect to an example Google Earth compatible implementation are described below. This discussion is illustrative and not intended to limit the present invention in any way.

As noted earlier, geo-spatial applications may render the intrinsically-curved surface of the Earth though a series of approximations, typically including the creation of a multi-resolution tiled triangle mesh, compression for network transmission, format and scale conversions for display using a graphics card and distance from camera encoding in a frame buffer for depth comparison. In embodiments, the inventors provide a system and method for generating and displaying several such surfaces in relative close proximity (such as the ocean floor and water surface), without spurious intersections (false islands) and with stable intersections (shorelines) across a wide range of viewing distances and resolution levels.

A water surface can be generated and displayed separately from the sea floor in Google Earth, across a wide range of viewing distances, from "outer space/orbit" to a few feet above (either) surface.

One way to address rendering for a wide range of distances is to use multi-resolution: every time the distance doubles, an application displays a completely separate representation of the data. The challenge is to generate these resolution levels such that they do not differ much from their neighboring levels and to display seamless scenes containing elements from several levels at once.

In one example, to display several surfaces in close proximity (e.g., water surface and sea floor), and having intersection curves that are of interest to the user (e.g. shorelines), the generation of the multi resolution representations for the surfaces is not independent, but rather done together.

In one environment, there are several approximations in a modeling—transmission—rendering chain used by a streaming geo-spatial application, each with the potential to introduce unwanted artifacts, and each are addressed in turn.

In the modeling stage, one can represent intrinsically curved surfaces (such as the water surface, a spherical surface) as a piecewise linear approximation, or a collection of triangles. Since the triangles are flat, they introduce an error, and this error can cause an unwanted intersection with the other surfaces (e.g. the ocean floor, creating a fake island). This can happen because a flat triangle with vertices on the surface of the sphere "dips" below the actual surface in the middle, and if the ocean bottom mesh contains a vertex in that area, with a depth smaller than the dip, it will be shown as poking above the water.

To address this issue, after the meshes for the two surfaces for a given tile in the latitude/longitude space, at a given resolution level, are generated, they are compared and tested to see if there are any unwanted intersections. All the triangles of the water surface mesh are rendered, computing the effective depth due to the linear approximation for every pixel, at a typical viewing resolution (for example, 256*256 pixels for a whole tile, matching the resolution that is shown for the ground imagery in a geo-spatial application such as Google Earth). A comparison is made between this depth and the specified depth of the other surface vertices. If the comparison produces an unwanted result (i.e. an underwater vertex shows above the water mesh), the altitude of the vertex is modified, effectively pushing the ground surface below the approximated water surface. While this does modify the mesh data, the error is comparable to the other errors in the approximation chain. Unfortunately testing just vertices in not enough, since surface inversions can also occur in the interior of edges. These situations can be detected and fixed by introducing additional vertices in the interior of the water surface edges, raising these new vertices to lie on the water surface, and then adding any additional edges needed to get back to a full triangulation.

Another approximation is the mesh simplification employed to reduce the number of triangles transmitted over the network and displayed in a client device. After converting a fully regular height grid into a fully tessellated triangle mesh, the mesh can be simplified keeping only triangles needed to represent significant geographical features (mountains, canyon, etc.) This simplification can drastically affect the intersection between two such simplified surfaces. To keep the shorelines persistent across resolution levels and with the displayed ground imagery texture, the shoreline can be computed using the fully tessellated grid, introducing new vertices between the samples of the original ground height grid, and treating these vertices as a special case during simplification, either keeping all of them in the resulting mesh, or simplifying them with a curve simplification algorithm, as opposed to a surface simplification algorithm used for the rest of the mesh.

Due to the typical poor resolution of bathymetric data, as compared to ground terrain data, or ground imagery, applications such as Google Earth may choose to soften the transition between the two mediums, gradually fading out the rendering of the water surface as it approaches the shore line. For a pleasing visual effect, the water surface must contain enough vertices to properly represent this opacity gradient.

Since most of the issues presented may require solutions that are computationally expensive, they are not addressed in the client application at run-time, but in advance, in a preprocessing stage, and the result is streamed over the network. To reduce bandwidth and latency, a set of compression algorithms or simplifying assumptions are used. However, these can introduce further problems in the context of two surfaces. In one example, ocean tiles that are far enough from the shore such that all vertices have full opacity can be streamed with a single bit and height value, indicating to the client to draw a fully opaque water quad for that latitude/longitude tile. Since the client is generating the water surface in this case (2 triangles in the simplest approximation), care must be taken again to not produce false islands due to the linear approximation.

A problem introduced by a multi-resolution tiled representation is the matching of neighboring tiles at boundaries. While it is relatively easy to ensure that tiles of the same resolution match, it is impossible to ensure that neighboring tiles of any two different resolutions match. To avoid drawing gaps between neighboring tiles of different resolutions rendered in the same scene, a client application can slightly enlarge each tile horizontally by displacing boundary vertices towards the exterior of the tile. Such displacements can introduce further errors by lowering the effective altitude in the interior of triangles adjacent to these boundary vertices, potentially creating fake islands. An application at a client can bound the maximum error introduced, based on the tile resolution level, and push the affected vertices "upward" (towards the exterior of the sphere) to avoid such intersection problems.

Exemplary system 100 and/or methods 400 and 700 or any part(s) or function(s) thereof may be implemented using hardware, software, firmware, tangible computer readable or computer usable storage media having instructions stored thereon, or a combination thereof and may be implemented in one or more computer systems or other processing systems.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for correcting terrain data for display via a user interface, the system comprising:
    receiving, by one or more processors, terrain data that represents Earth features for a geographic area including a certain physical location,
    generating, by the one or more processors, (i) a water surface mesh including a first plurality of geometric primitives and (ii) a water bottom mesh including a second plurality of geometric primitives, based on the terrain data,
    identifying, by the one or more processors, portions of the water bottom mesh appearing above the water surface mesh at the physical location, and
    correcting, by the one or more processors, at least one of the water surface mesh and the water bottom mesh to cause the water surface mesh to appear above the water bottom mesh.

2. The method of claim 1, further comprising:
    removing, by the one or more processors, some of the primitives from the water surface mesh to generate a simplified water surface mesh in view of water/land boundaries, prior to the correcting, and
    removing, by the one or more processors, some of the primitives from the water bottom mesh to generate a simplified water bottom mesh in view of geographic features, prior to the correcting.

3. The method of claim 2, wherein removing some of the primitives from the water bottom mesh includes:
    analyzing, by the one or more processors, a topology of the water bottom mesh to identify the geographic features, wherein the geographic features includes at least one of (i) a mountain, (ii) a canyon, or (iii) a shelf area near a coastline or island, and
    removing, by the one or more processors, primitives farther away from the identified geographic features and retaining primitives relatively close to the identified geographic features.

4. The method of claim 2, further comprising:
    adding, by the one or more processors, new vertices to the water surface mesh at regions corresponding to the water/land boundaries,
    wherein removing some of the primitives from the water surface mesh includes removing, by the one or more processors, primitives farther away from the water/land boundaries and retaining primitives relatively close to the water/land boundaries.

5. The method of claim 4, wherein removing some of the primitives from the water surface mesh further includes determining, by the one or more processors, a curve based on the added vertices and retaining primitives associated with the curve.

6. The method of claim 1, wherein receiving the terrain data includes receiving a height grid that indicates elevation at various locations.

7. The method of claim 1, wherein correcting the at least one of the water surface mesh and the water bottom mesh includes:
identifying, by the one or more processors, surface inversions between the water bottom and water surface meshes, wherein the identifying includes computing intersections of edges of the simplified water surface mesh with edges of the simplified water bottom mesh along a viewing direction, and
altering, by the one or more processors, mesh information in at least one of the water bottom and water surface meshes to remove the identified inversions, wherein the altering includes adding new vertices in the simplified water surface mesh located at the respective computed intersections of the simplified water surface mesh.

8. The method of claim 1, wherein generating the water surface mesh and the water bottom mesh includes generating respective multi-resolution tiled triangle meshes.

9. A computing system for generating terrain data for display via a user interface, the system comprising:
one or more processors; and
a non-transitory computer-readable medium storing thereon instructions that, when executed by the one or more processors, cause the computing system to:
receive terrain data that represents Earth features for a geographic area including a certain physical location,
generate, based on the terrain data, (i) a water surface mesh including a first plurality of vertices and (ii) a water bottom mesh including a second plurality of vertices,
identify portions of the water bottom mesh appearing above the water surface mesh at the physical location, and
correct at least one of the water surface mesh and the water bottom mesh to cause the water surface mesh to appear above the water bottom mesh.

10. The computing system of claim 9, wherein the instructions further cause the system to transmit the corrected water surface mesh and the corrected water bottom mesh to a client device for display.

11. The computing system of claim 9, wherein the instructions further cause the system to:
remove some of the primitives from the water surface mesh to generate a simplified water surface mesh in view of water/land boundaries, prior to the correcting, and
remove some of the primitives from the water bottom mesh to generate a simplified water bottom mesh in view of geographic features, prior to the correcting.

12. The computing system of claim 11, wherein to remove some of the primitives from the water bottom mesh, the instructions cause the system to:
analyze a topology of the water bottom mesh to identify the geographic features, wherein the geographic features includes at least one of (i) a mountain, (ii) a canyon, or (iii) a shelf area near a coastline or island, and
remove primitives farther away from the identified geographic features and retain primitives relatively close to the identified geographic features.

13. The computing system of claim 11, wherein the instructions further cause the system to:
add new vertices to the water surface mesh at regions corresponding to the water/land boundaries, and
remove primitives farther away from the water/land boundaries and retaining primitives relatively close to the water/land boundaries, in the water surface mesh.

14. The computing system of claim 9, wherein the terrain data includes a height grid that indicates elevation at various locations.

15. A non-transitory computer-readable medium storing thereon instructions that, when executed by the one or more processors, cause the one or more processors to:
receive terrain data that represents Earth features for a geographic area including a certain physical location,
generate, based on the terrain data, (i) a water surface mesh including a first plurality of vertices and (ii) a water bottom mesh including a second plurality of vertices,
identify portions of the water bottom mesh appearing above the water surface mesh at the physical location, and
correct at least one of the water surface mesh and the water bottom mesh to cause the water surface mesh to appear above the water bottom mesh.

16. The computer-readable medium of claim 15, wherein the instructions further cause the one or more processors to transmit the corrected water surface mesh and the corrected water bottom mesh to a client device for display.

17. The computer-readable medium of claim 15, wherein the instructions further cause the one or more processors to:
remove some of the primitives from the water surface mesh to generate a simplified water surface mesh in view of water/land boundaries, prior to the correcting, and
remove some of the primitives from the water bottom mesh to generate a simplified water bottom mesh in view of geographic features, prior to the correcting.

18. The computer-readable medium of claim 17, wherein to remove some of the primitives from the water bottom mesh, the instructions cause the one or more processors to:
analyze a topology of the water bottom mesh to identify the geographic features, wherein the geographic features includes at least one of (i) a mountain, (ii) a canyon, or (iii) a shelf area near a coastline or island, and
remove primitives farther away from the identified geographic features and retain primitives relatively close to the identified geographic features.

19. The computer-readable medium of claim 17, wherein the instructions further cause the one or more processors to:
add new vertices to the water surface mesh at regions corresponding to the water/land boundaries, and
remove primitives farther away from the water/land boundaries and retaining primitives relatively close to the water/land boundaries, in the water surface mesh.

20. The method of claim 1, wherein the water surface mesh represents a lake, sea, or ocean.

* * * * *